United States Patent
Ackermann et al.

[15] 3,670,016
[45] June 13, 1972

[54] PROCESS FOR PREPARING ACRYLIC OR METHACRYLIC ACID

[72] Inventors: Jacob Ackermann, Gorla Minore; Roberto Croce, Erba; Riccardo Reguzzoni, Busto Arsizio, all of Italy

[73] Assignee: Societa Italiana Resine S.p.A., Milan, Italy

[22] Filed: June 16, 1969

[21] Appl. No.: 833,749

[30] Foreign Application Priority Data

June 24, 1968 Italy....................18117 A/68

[52] U.S. Cl.................................260/526 N, 260/488 J
[51] Int. Cl..........................................C07c 57/04
[58] Field of Search...............................260/526 N

[56] References Cited

UNITED STATES PATENTS 3,247,248   4/1966   Sims et al..............................260/526

*Primary Examiner*—James A. Patten
*Attorney*—Sughrue, Rothwell, Mion, Zinn & Macpeak

[57] ABSTRACT

Preparing acrylic or methacrylic acid by mixing a polyoxymethylene methyl or ethyl diester with a carboxylic acid corresponding to that present in ester form in the diester, the mixture is vaporized at 180° to 400°C, and the vapors passed at 180° to 450°C over a catalyst, namely an aluminum or magnesium silicate or the like or an oxide, hydroxide or carbonate of a metal of group I$a$ or II$a$, or boron or aluminum.

13 Claims, No Drawings

PROCESS FOR PREPARING ACRYLIC OR METHACRYLIC ACID

BACKGROUND TO THE INVENTION

The invention relates to a process for preparing unsaturated aliphatic acids, namely acrylic and methacrylic acid, from polyoxymethylene diesters.

By diesters of the polyoxymethylenes we refer to compounds of the following general formula:

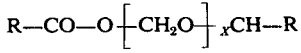

wherein $x$ has a value greater than 3, and R is a methyl or ethyl radical.

Compounds of this class, in which $x$ is relatively low, are formed, for instance, as by-products in processes wherein raw formaldehyde polymers are stabilized by esterification of the terminal hydroxyl groups of the macromolecules by means of the anhydride of a carboxylic acid. Their formation is due to the processes of dissociation of the polymeric chains, the by-products being also formed from the low molecular weight polymer fraction normally present in raw formaldehyde.

Such low molecular weight polymers react with the anhydride of the carboxylic acid in the formation of by-products comprising polyoxymethylene diesters of a low molecular weight, which are separated in order to prevent impairment of the mechanical properties of the formaldehyde polymers, and are therefore waste products.

The polyoxymethylene diesters in which $x$ is 4 or 5 are liquid at room temperature and may be purified and separated by distillation in vacuum, but there are no uses known for them at present.

The products of higher molecular weight, such as those in which $x$ is 6 to 30, might perhaps be utilized as waxes, and are pasty or solid at room temperature. They are difficult to separate into compounds of a well-defined melting point and are ultimately of very low worth.

In the present invention there may also be used polyoxymethylene diesters which are of high molecular weight, that is, high polymers of formaldehyde wherein the terminal groups of the macromolecules are in an esterified form.

Thus, for instance, it is convenient to use formaldehyde polymers which for any reason are no longer of commercial value, such as products of unsuitable molecular weight, or badly colored or insufficiently stable products.

BRIEF DESCRIPTION OF THE INVENTION

It has now been found that these diesters of polyoxymethylenes of the following general formula:

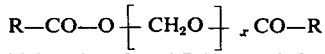

wherein $x$ is higher than 3 and R is a methyl or ethyl radical, may be converted by catalytic reaction at a temperature of 180° to 400° C to the unsaturated acids having one carbon atom more with respect to the carboxylic acid present in an esterified form in the polyoxymethylene diester (i.e., polyoxymethylene diacetates and dipropionates are converted to acrylic and methacrylic acids, respectively), by a process in which the diester is degraded to volatile products by admixture with an aliphatic carboxylic acid, corresponding to the carboxylic acid present in an esterified form in the polyoxymethylene diester, at high temperature and subsequent passage of the vaporized mixture over suitable catalysts. The diester is thus degraded chiefly to polyoxymethylene hemiester as well as to other easily vaporizable compounds.

DESCRIPTION OF THE PREFERRED EMBODIMENTS

The molar ratio of polyoxymethylene diester: carboxylic acid should amount to 1:1 to 1:20, preferably 1:2 to 1:8, the mols of the diester being expressed as actually fed mols multiplied by $x$, wherein $x$ stands for the number of oxymethylene groups present in the diester molecule.

The gaseous feed, comprising the degradation products of polyoxymethylene diester and the carboxylic acid, is supplied to a suitable catalyst in which conversion to unsaturated acid at a temperature between 180° and 450° C, preferably 290° C to 400° C takes place.

Improved results are sometimes obtained when the reagent mixture is diluted with a gas inert towards the reagents and reaction products, such as nitrogen, argon or carbon dioxide. The volumetric ratio of the gaseous reagent mixture to the inert gas is preferably 1:1 to 1:10.

Preferably, atmospheric pressure or a slightly superatmospheric pressure is used. Operation can be carried out in vacuum or at pressures of some atmospheres, but no particular advantages are obtained.

Active catalysts for the purposes of the invention are of various types; the preferred catalysts are those obtained from an inert carrier treated with an oxide, hydroxide or carbonate of one of the following metals:

- metals of group I$a$ of the periodic table of elements, more particularly lithium, sodium and potassium;
- metals of group II$a$ of the periodic table of elements, more particularly magnesium, calcium and barium;
- boron and aluminum.

Carbon, asbestos and silica gel may be utilized as inert carriers.

A further group of substances which may be employed as catalysts comprises: natural or synthetic aluminum silicates, molecular sieves, calcium phosphate, magnesium phosphate, aluminum phosphate and aluminum oxide.

Generally, no particular activation of the catalyst is required, though in some cases a treatment at temperatures of 300° to 600° C in the presence of steam and/or air is useful.

The catalyst may be employed in the form of a stationary bed, when the spatial velocity may be between 100 and 600 liters of gas supplied (the gas volume being calculated at atmospheric pressure and 20° C) per hour per liter catalyst. Where the catalyst is employed in the form of a fluidized bed, the gas residence time in the reactor is preferably maintained between 1 and 30 seconds.

Under the above defined conditions the yields of acrylic or methacrylic acid reach values up to 90–95 percent or even more.

The unsaturated acid is easily recovered from the reaction products and may be obtained in a pure form by distillation in vacuum.

The unreacted products may be recycled to the reactor for further reaction.

The following examples further illustrate the invention.

EXAMPLE 1

A suspension comprising 10 percent by weight polyoxymethylene diacetate (the average value of $x$ being about 30) and 90 percent by weight acetic acid, was continuously supplied to a reactor maintained in a temperature of about 230° C.

The resulting vapors were mixed with nitrogen so that the volumetric ratio of the vaporized suspension to nitrogen amounted to 1:10, and passed through a superheater to heat them to 390° C, then fed through a porous diaphragm to the bottom of a tubular glass reactor.

The catalyst consisted of silica (sand) on which was precipitated an aluminosilicate of high specific area of the composition by weight: $Si_2O$ 88–92%, and $Al_2O_3$ 12–8%.

After being dried at 200°–300° C, 300 g catalyst were placed in a column 2.6 cm in diameter, previously filled with water, and treated with 5 liters of a saturated solution of calcium hydroxide in distilled water. The solution was fed at a rate of 250–300 ml/hour. Upon completion of this treatment the catalyst was washed with distilled water for 10 hours at the rate of 250–300 ml/hour.

The catalyst treated as above, of a particle size of 50–80 mesh, was activated at 380° C for 10 hours.

The gaseous feed mixture was passed through the fluidized reactor bed at a rate of 800 liters approximately per liter catalyst and per hour.

The reactor was externally electrically heated from the outside so as to maintain the reaction temperature at 390° C.

The vapors issuing from the reactor were readily condensed in a flowing water condenser, the condensate was analyzed by gas-chromatography and by chemical analysis by bromination of the double link. Bromination is effected by means of a solution of bromine in 0.2 normal potassium bromide. (When this method was tested on acrylic acid of analytic grade (over 99 percent purity), it showed an acid content of 98 percent.)

The gas-chromatography was carried out at 140° C in a helium stream, utilizing a column filled with cross-linked, microporous, aromatic, polyolefin.

The analysis of the condensate showed a conversion of the reagents to acrylic acid mounting to 52 percent.

The conversion was calculated by the relation:

$$\text{Percent conversion} = \frac{\text{mols of formed unsaturated acid}}{\text{mols of supplied polyoxymethylene diester}} \times 100$$

wherein the diester mols are multiplied by the value of $x$ as defined above.

The analysis further also showed that the yield of acrylic acid on the conversion exceeded 90 percent.

EXAMPLE 2

The procedure was carried out as in example 1, but the evaporator was charged with a suspension comprising 90 percent by weight polyoxymethylene dipropionate, the value of $x$ being about 15, and 91 percent anhydrous proprionic acid.

The vapors were mixed with nitrogen to obtain a volumetric ratio of the evaporated suspension to nitrogen of 1:8, and were passed through a superheater which heated them to 360° C, then fed to the fluidized bed reactor which was maintained at a reaction temperature of 360° C.

The catalyst was prepared as in example 1, except that a 0.1 normal lithium hydroxide solution was employed in place of the calcium hydroxide solution.

The spatial velocity of the vapor was 650 liters per liter of catalyst and per hour.

The analysis of the condensate issuing from the reactor showed a conversion, calculated as in Example 1, of 42 percent, and a methacrylic acid yield on conversion exceeding 90 percent.

What is claimed is:

1. A process for preparing acrylic or methacrylic acid, wherein one or more polyoxymethylene diesters of the following general formula:

R—CO—O—[CH$_2$O]$_x$—CO—R, wherein $x$ is greater than 3 and R is a methyl or ethyl radical, is mixed with a carboxylic acid corresponding to the carboxylic acid present in an esterified form in the polyoxymethylene diester at a temperature of 180° to 400° C and in a manner such as to vaporize the mixture; and the resulting vapors are contacted at a temperature of 180° to 450° C with a catalyst selected from the group consisting of
   a. oxides, hydroxides, and carbonates, of one or more metals selected from the group consisting of lithium, sodium, potassium, magnesium, calcium, barium, boron, and aluminum, and
   b. natural aluminum silicates, synthetic aluminum silicates, molecular sieves, calcium phosphate, magnesium phosphate, aluminum phosphate, and aluminum oxide.

2. A process as claimed in claim 1 wherein the quantity of carboxylic acid used is such that the molar ratio of polyoxymethylene diester/carboxylic acid is 1:1 to 1:20, the number of mols of polyoxymethylene diester being expressed as the product of the actual number of mols and the value of $x$ as defined in claim 1.

3. Process as claimed in claim 2, wherein the molar ratio is 1:2 to 1:8.

4. A process as claimed in claim 1, wherein the mixture of diester and carboxylic acid is diluted with an inert gas in a quantity of 1 to 10 volumes inert gas to 1 volume of said mixture.

5. A process as claimed in claim 1 wherein the catalytic reaction is carried out at a temperature of 290° to 400° C.

6. A process as claimed in claim 1, wherein the catalyst is activated before use at a temperature of 300° to 600° C in the presence of at least one member selected from the group consisting of steam and air.

7. A process as claimed in claim 1 wherein the catalyst is employed in the form of a stationary bed, and the gaseous feed mixture is supplied at a rate of 100 to 600 liters gas (the volume being calculated at 20° C and 1 atmosphere) per liter of catalyst per hour.

8. A process as claimed in claim 1 wherein the catalyst is employed in a fluidized bed and the residence time of the gas in the bed is 1 to 30 seconds.

9. A process as in claim 1 which is conducted at least atmospheric pressure.

10. A process as claimed in claim 1 further comprising distilling, under vacuum, the product resulting from contacting with the catalyst to thereby separate therefrom acrylic or methacrylic acid.

11. A process as claimed in claim 1 wherein the catalyst is supported on an inert carrier.

12. A process as claimed in claim 1 wherein $x$ is in the range of from greater than 3 to 30.

13. A process as claimed in claim 1 wherein $x$ is 6 to 30.

* * * * *